(12) United States Patent
Kondo

(10) Patent No.: US 9,146,860 B2
(45) Date of Patent: Sep. 29, 2015

(54) FLASH MEMORY CONTROLLER, FLASH MEMORY SYSTEM, AND FLASH MEMORY CONTROL METHOD

(71) Applicant: TDK Corporation, Tokyo (JP)

(72) Inventor: Takashi Kondo, Tokyo (JP)

(73) Assignee: TDK Corporation, Tokyo (JP)

( * ) Notice: Subject to any disclaimer, the term of this patent is extended or adjusted under 35 U.S.C. 154(b) by 200 days.

(21) Appl. No.: 13/914,729

(22) Filed: Jun. 11, 2013

(65) Prior Publication Data

US 2014/0059274 A1    Feb. 27, 2014

(30) Foreign Application Priority Data

Aug. 22, 2012    (JP) .................................. 2012-183364

(51) Int. Cl.
*G06F 12/02* (2006.01)

(52) U.S. Cl.
CPC .... *G06F 12/0246* (2013.01); *G06F 2212/7205* (2013.01); *Y02B 60/1225* (2013.01)

(58) Field of Classification Search
CPC ..................... G06F 12/0246; G06F 2212/7205
USPC .......................................................... 711/103
See application file for complete search history.

(56) References Cited

U.S. PATENT DOCUMENTS 8,904,082 B1 * 12/2014 Brahmadathan et al. ..... 711/103
2007/0143534 A1    6/2007 Hashimoto et al.

FOREIGN PATENT DOCUMENTS

JP    11-212856 A    8/1999
JP    2011-022778 A    2/2011

* cited by examiner

*Primary Examiner* — Jasmine Song
(74) *Attorney, Agent, or Firm* — Posz Law Group, PLC

(57) ABSTRACT

A flash memory controller configures, in a polling interval storage part, a polling interval, which is a time interval for outputting an acquisition signal for acquiring from a flash memory, information showing whether or not the execution of programming or erasing has ended after the execution of the programming or erasing has started with respect to the flash memory. The flash memory controller sends either a program command or an erase command to the flash memory, and thereafter, outputs the acquisition signal in accordance with the configured polling interval until information denoting that the execution of either the programming or the erasing has ended is received.

7 Claims, 9 Drawing Sheets

FLASH MEMORY CONTROLLER, FLASH MEMORY SYSTEM, AND FLASH MEMORY CONTROL METHOD

CROSS-REFERENCE TO PRIOR APPLICATION

This application relates to and claims the benefit of priority from Japanese Patent Application No. 2012-183364 filed on Aug. 22, 2012, the entire disclosure of which is incorporated herein by reference.

BACKGROUND

The present invention generally relates to flash memory control.

When a flash memory controller issues a command, such as a data write (Program) command or an erase (Erase) command, to a flash memory, the flash memory executes an operation corresponding to a program command, an erase command, or another such command, and transitions to a Busy state during this time. Flash memory capacity has increased in recent years, and as such, the processing time corresponding to a command has become longer, and the time (Busy time) during which the flash memory is in the Busy state has grown to an extended period of time. In the case of a program and an erase in particular, the Busy state has transitioned to an order of milliseconds (ms).

When the flash memory is no longer in the Busy state, the flash memory controller issues a command, such as a different program command or a erase command, and executes the operation in the flash memory. The flash memory controller must therefore detect the fact that the flash memory is not in the Busy state.

As methods for detecting the Busy state of the flash memory, for example, there is (1) a method whereby the flash memory controller detects the fact that the flash memory is no longer in the Busy state on the basis of an FRDY signal outputted from an external pin (FRDY pin) of the flash memory; and (2) a method whereby the flash memory controller detects whether or not the flash memory is in the Busy state by executing status read (issuing a status command to the flash memory) and referencing a busy bit in status data sent (read) from the flash memory at intervals.

For example, in Japanese Patent Application Laid-open No. 2011-22778, there is disclosed a technique for confirming that either a flash memory program or erase has ended in order to detect the Busy state.

SUMMARY

For example, in the method described in (1) above, the problem is that a pin for detecting the FRDY signal must be provided in the flash memory controller, and, for example, in a case where the flash memory controller controls a plurality of flash memories, a plurality of pins must be provided. Furthermore, in the method described in (2) above, the problem is that the flash memory controller must perform a status read repeatedly a plurality of times using polling, for example, to acquire the flash memory status, resulting in high power consumption. Execution time is particularly long when programming and erasing, and this is a problem in that wasted power consumption becomes even higher.

An object of the present invention is to provide a technique that makes it possible to reduce power consumption while holding down the number of pins required in the flash memory controller.

A flash memory controller according to a first aspect is a flash memory controller for programming and erasing a flash memory, comprising:

a polling interval storage part is configured to store a polling interval, which is a time interval for outputting an acquisition signal for acquiring from the flash memory, information showing whether or not the execution of programming or erasing has ended after the programming or the erasing has started with respect to the flash memory;

a setup part is configured to configure the polling interval in the polling interval storage part; and a polling processor is configured to send either a program command or an erase command to the flash memory, and, thereafter, output the acquisition signal in accordance with the polling interval until information denoting that the execution of either the programming or the erasing has ended is received.

A flash memory controller of a second aspect according to the first aspect, further comprising:

a start criterion storage part is configured to store start criterion time information constituting a time criterion for starting an output of the acquisition signal;

a measurement part is configured measure an execution time required for either programming or erasing data with respect to the flash memory; and a start criterion setup part is configured to store the measured execution time in the start criterion storage part as start criterion time information, wherein the polling processor is configured to start outputting the acquisition signal on the basis of the start criterion time information stored in the start criterion storage part.

A flash memory controller of a third aspect according to the second aspect, wherein the flash memory is a Multi Level Cell (MLC) flash memory and comprises a plurality of blocks, each block comprising a plurality of pages, and the start criterion setup part is configured to store, in the start criterion storage part, the execution time for a page, of a pair of pages in the flash memory, for which the time required for programming is shorter.

A flash memory controller of a fourth aspect according to either the second aspect or the third aspect, wherein the flash memory is provided in plurality, the start criterion storage part exists for each of the flash memories, and the start criterion storage part is configured to store the execution time for the flash memory corresponding to that start criterion storage part as start criterion time information, and the polling processor acquires start criterion time information from a start criterion storage part corresponding to a destination flash memory of either the program command or the erase command from among the plurality of start criterion storage parts, and starts outputting the acquisition signal to the destination flash memory of either the program command or the erase command on the basis of this start criterion time information.

A flash memory controller of a fifth aspect according to any one of the first through the fourth aspects, wherein the flash memory is provided in plurality, and the polling interval storage part is shared by the plurality of flash memories.

A flash memory controller of a sixth aspect according to any one of the second through the fifth aspects, wherein the measurement part is configured to measure the execution time for the flash memory in a case where the start criterion time information is configured or changed.

A flash memory system according to a seventh aspect, comprising:

the flash memory controller according to any one of the first through the sixth aspect; and a flash memory coupled to this flash memory controller.

A flash memory control method according to an eighth aspect, comprising the steps of:

configuring, in a polling interval storage part, a polling interval, which is a time interval for outputting an acquisition signal for acquiring, from the flash memory, information showing whether or not the execution of programming or erasing has ended after the programming or the erasing has started with respect to the flash memory;

sending either a program command or an erase command to the flash memory; and outputting the acquisition signal thereafter in accordance with the polling interval until information denoting that the execution of either the programming or the erasing has ended is received.

It is possible to configure a polling interval for outputting an acquisition signal for acquiring, from a flash memory, information showing whether or not either programming or erasing has ended and to output the acquisition signal in accordance with the polling interval. It is therefore possible to configure an appropriate polling interval corresponding to a flash memory coupled to the flash memory controller, making it possible to reduce power consumption.

DETAILED DESCRIPTION OF THE EMBODIMENT

Figure 1:
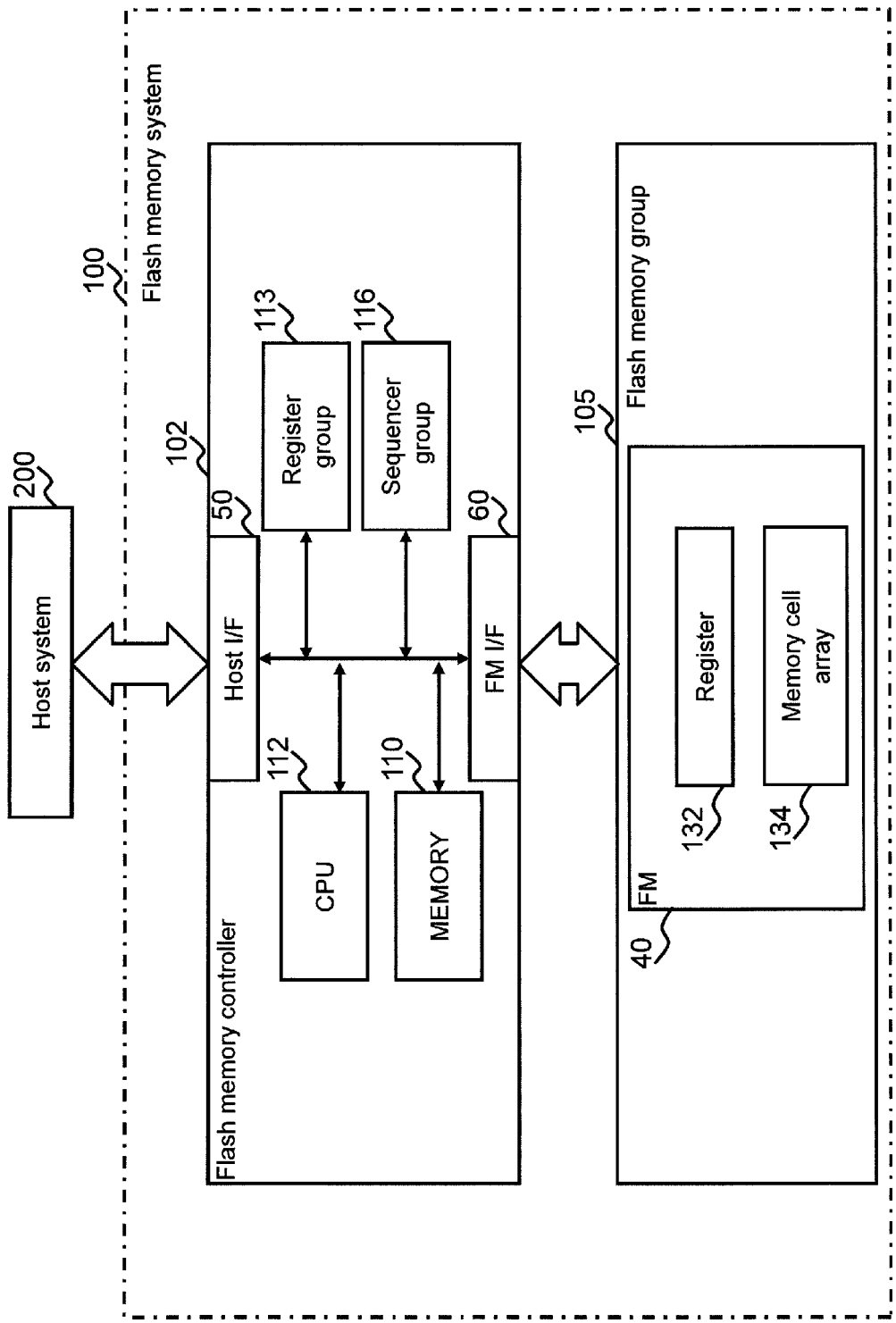
FIG. 1 shows an example of the configuration of a flash memory (FM) system related to an embodiment.

An embodiment will be explained below. In the drawings, flash memory may be abbreviated as "FM", logical block may be abbreviated as "LB", logical page may be abbreviated as "LP", physical block may be abbreviated as "PB", and physical page may be abbreviated as "PP".

FIG. 1 shows an example of the configuration of an FM system related to the embodiment.

The FM system 100 is coupled to be accessible from a host system 200. The FM system 100 comprises an FM controller 102 and an FM group 105. The FM group 105 includes one or more FMs 40. The FM controller 102 controls an access from the host system 200 to the FM 40.

The FM 40 comprises a nonvolatile memory cell array 134 and a register (hereinafter, FM register) 132. The FM register 132 is for temporarily storing data input/output between the FM controller 102 and the memory cell array 134.

The memory cell array 134, for example, is a NAND type. The memory cell array 134, for example, is a Multi Level Cell (MLC) type. The memory cell array 134 is configured from at least one FM chip and comprises a plurality of physical blocks. Each physical block comprises a plurality of physical pages. In the NAND-type memory cell array 134 here, the unit for a data write/read (a storage area capable of being inputted to or outputted from one time at data write/read) is a page (a physical page), and the unit for a data erase is a block (a physical block). In this embodiment, the storage capacity of the FM register 132 is configured to be equivalent to the storage capacity of a single physical page, which is the write/read unit.

Figure 2:
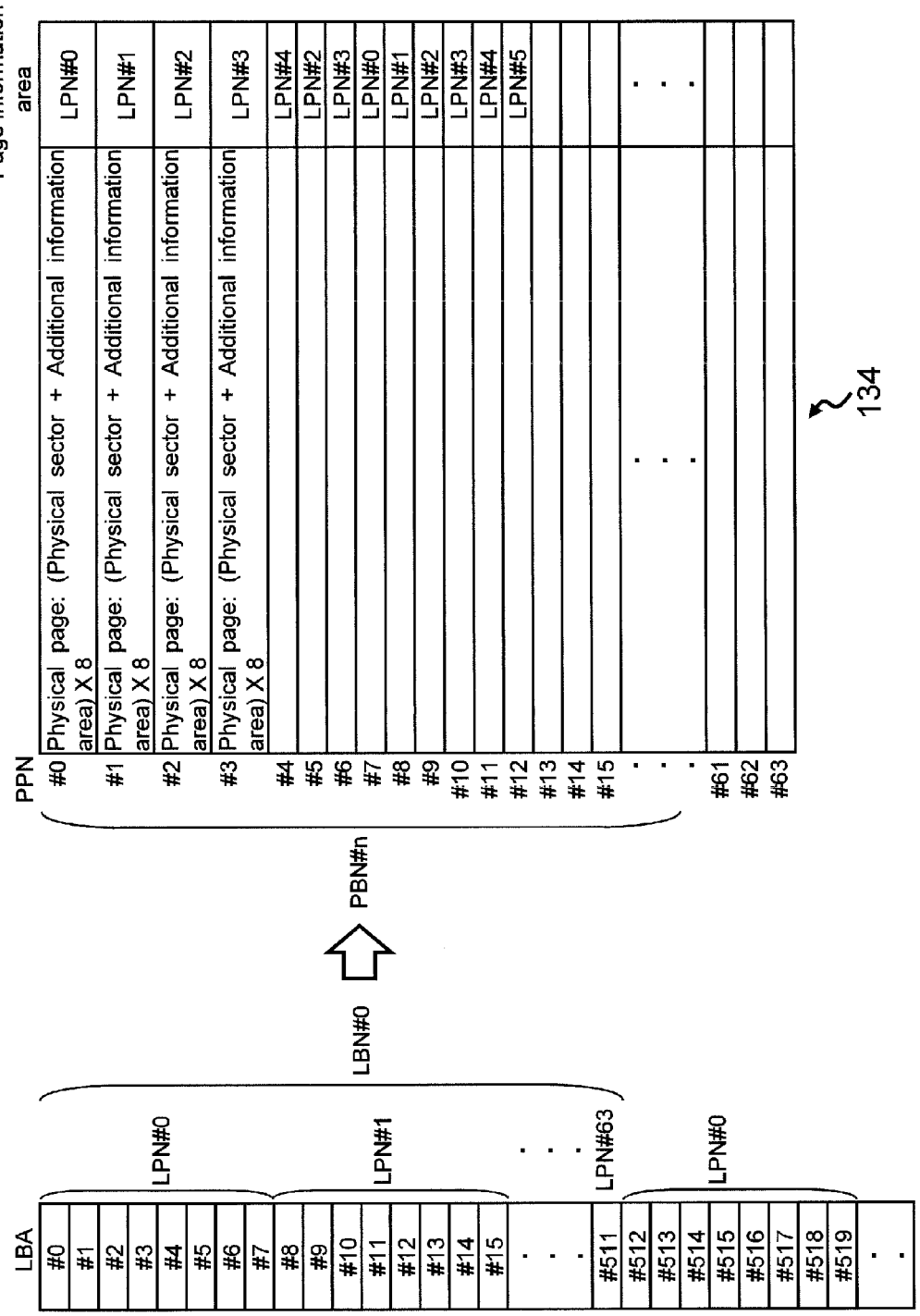
FIG. 2 shows one example of a corresponding relationship between a logical address space recognized by a host system and a physical address space in a memory cell array.

FIG. 2 shows an example of a corresponding relationship between a logical address space recognized by the host system 200 and a physical address space in the memory cell array 134. An example of a large number of physical pages (only one physical block's worth of physical pages has been extracted) in the memory cell array 134 is shown on the right side of FIG. 2. As shown in the right-side portion, each physical page comprises a plurality (typically, a number equivalent to a power of 2) of physical sectors. In this embodiment, a physical page, for example, comprises eight physical sectors. A physical sector is an area in which the data of one sector (512 bytes) is stored. One additional information area is allocated to each physical sector. Each physical page also comprises one page information area. Any one logical page (a storage area to which a logical page number (LPN) such as #0, #1, #2, . . . is assigned in the logical address space shown on the left side of FIG. 2) in the logical address space can be associated with each physical page by the FM controller 102. One logical page may be associated with each physical page like this, or a plurality of physical pages may be associated with one logical page. User data of each logical sector in the logical page associated with the physical sector is stored in each physical sector in each physical page, and an error correction code (ECC) for the user data is stored in the additional information area allocated to the physical sector. Also, information (for example, a logical page number (LPN)) for identifying a logical page associated with the physical page and other management and/or control information is stored in the page information area of each physical page.

Refer to FIG. 1 once again. The FM register 132 comprises a configuration that conforms to the configuration of one physical page described hereinabove. That is, the FM register 132 comprises a set of eight sector areas and eight ECC areas for respectively holding the user data and the ECC stored in each of the eight physical sectors and eight additional information areas in a single physical page.

Now then, as explained hereinabove, in a NAND-type FM 40, a data write and read are carried out having a physical page as a unit. In a case where data is to be written to the FM 40, first of all, one physical page's worth of data of the write destination (eight physical sectors' worth of data, eight additional information areas' worth of data, and one page information area's worth of data) is written from the FM controller 102 to the FM register 132 in the FM 40, and thereafter, this data is written from the FM register 132 to the write-destination physical page in the memory cell array 134. Alternatively, in a case where data is to be read from the FM 40, first of all, one physical page's worth of data (eight physical sectors' worth of data, eight additional information areas' worth of data, and one page information area's worth of data) is read from a read-source physical page in the memory cell array 134 to the FM register 132, and thereafter, this data is read from the FM register 132 to the FM controller 102.

The FM controller 102 comprises a host I/F 50, an FM I/F 60, a register group 113, a buffer group 115, a sequencer group 116, a memory 110, and a microprocessor (hereinafter, CPU) 112.

The host I/F 50 is a communication interface device coupled to the host system 200. The host I/F 50 receives a command (for example, a write command and a read command) from the host system 200.

The FM I/F 60 is a communication interface device coupled to the FM group 105 (one or more FMs 40). Write-target data is written to the FM 40 through the FM I/F 60, and data read from the FM 40 is received and stored in a buffer.

The register group 113 is one or more registers. The registers in the register group 113, for example, include an LBA register in which an LBA specified by a command (for example, a write command and a read command) from the host system 200 is configured, a command register in which a command from the host system 200 is written, a data register in which either write-target or read-target data (user data) for the host system 200 is written, and a polling interval setup register 114 (refer to FIG. 3) in which is configured a status read polling interval for reading status data from the FM 40.

Figure 3:
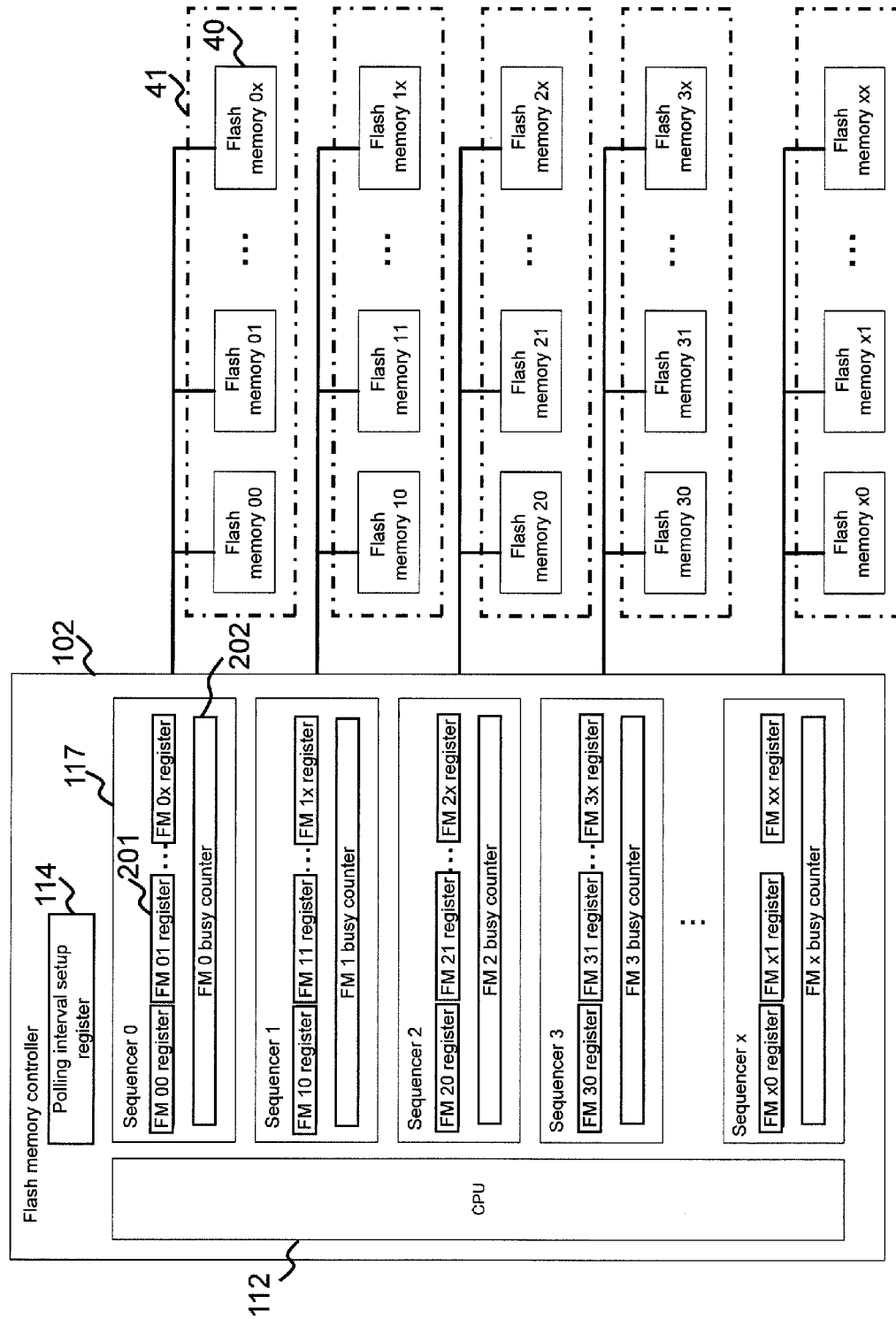
FIG. 3 shows an example of the detailed configuration of a flash memory system related to the embodiment.

A sequencer group 116 includes one or more sequencers 117 (refer to FIG. 3). An example of a sequencer 117 in the sequencer group 116 will be explained further below.

The memory 110 stores information for either controlling or managing the FM 40. For example, this information includes a management table for each FM 40. The management table may include, for the FM 40 corresponding to the table, information denoting which physical area (for example, a physical block or a physical page) is allocated to which logical area (for example, a logical block or a logical page), information denoting the attribute of a physical page (for example, a primary physical page or a secondary physical page), and information denoting which physical block is a bad block. Furthermore, the memory 110 may store a computer program (for example, firmware) executed by the CPU 112.

The CPU 112 controls the operations of the FM controller 102.

The control performed by the CPU 112 of the FM controller 102 when a new write request is received will be explained in more detail hereinbelow. In this explanation, first the corresponding relationship between a logical address space recognized by the host system 200 and a physical address space in the memory cell array 134 in this embodiment will be explained by referring to FIG. 2.

The logical address space is shown on the left side of FIG. 2. A large number of logical sectors exists in the logical address space, and these logical sectors are identified using an LBA that is assigned to each logical sector. Then, one logical page is configured by aggregating a plurality (eight in this embodiment) of logical sectors. In addition, one logical block is configured by aggregating a plurality (64 in this embodiment) of logical pages. A plurality of logical blocks is configured in this manner, and these logical blocks are identified using a logical block number (LBN) that is assigned to each block. The plurality (for example, 64) of logical pages in each logical block is identified using a logical page number (LPN) that is assigned to each logical page.

The physical address space in the memory cell array 134 (only one physical block's worth of the physical address space has been extracted) is shown on the right side of FIG. 2. One physical block is configured in the physical address space by aggregating a plurality (64 in this embodiment) of physical pages. Although omitted from the drawing shown in FIG. 2, a plurality (more than the total number of logical blocks) of physical blocks exist in the memory cell array 134, and these physical blocks are identified using a physical block address (PBA) that is assigned to each physical block. Then, a plurality (for example, 64) of physical pages in each physical block is identified using a physical page number (PPN) that is assigned to each physical page. As already explained, each physical page is configured from a plurality (eight in this embodiment) of physical sectors, and, in addition, comprises eight additional information areas and one page information area associated with the physical sector.

As shown in FIG. 2, any one logical block (for example, logical block LBN #0) is associated with each physical block in the memory cell array 134 (for example, physical block PBA #0) by the CPU 112 of the FM controller 102. Then, any one of the logical pages (for example, logical pages LPN #0 through LPN #5) in the logical block associated with the physical block is associated with each physical page (for example, physical pages PPN #7 through PPN #12) in each physical block by the CPU 112. Information (for example, the LPN) showing the logical page associated with the physical page is described in the page information area of each physical page.

By the way, a physical page that is still not associated with any logical page can exist in the memory cell array 134. One physical page (a physical page that is not associated with any logical page) is associated with a logical page in response to a write request from the host system 200, and programming is performed for this physical page.

FIG. 3 shows an example of the detailed configuration of the flash memory system related to the embodiment. A portion of the configuration has been omitted from the drawing in FIG. 3.

The FM controller 102 includes a CPU 112 as an example of the setup part, a polling interval setup register 114 as an example of polling interval storage part, and one or more sequencers 117. The sequencer 117 is an example of the polling processor and the start criterion setup part. A plurality of partial FM groups 41, in which a plurality of FMs 40 is coupled in parallel, is coupled to the FM controller 102. FM 00 through FM 0x (where x is an arbitrary integer) belong to the same partial FM group 41, and similarly, each of FM 10 through FM 1x, FM 20 through FM 2x, . . . FM x0 through FM xx, respectively, belongs to the same partial FM group 41.

The polling interval setup register 114 stores a polling interval. The polling interval is an interval of time for outputting a status read signal (acquisition signal) to the FM 40 to acquire status data including a status (to perform a status read). The polling interval may be configured by the CPU 112 on the basis of a prescribed condition, or may be configured by the CPU 112 on the basis of an instruction from outside the FM system 100 (for example, an instruction from the host system 200).

The polling interval may be an interval (for example, ½ a maximum read Busy duration) based on the read Busy duration (the time it takes after issuing a read command to the FM until Busy is terminated), in particular, the maximum read Busy duration, which is the maximum value of the read Busy duration. The read Busy duration is shorter than the Busy duration related to a program and the Busy duration related to an erase. When a status read signal is outputted at a polling interval based on the read Busy duration like this, it is possible to both reduce the power consumed in line with regularly outputting a status read signal and to detect the termination of a Busy.

In this embodiment, the polling interval is common to all the FMs 40 in the FM system 100. Specifically, for example, the polling interval setup register 114 is shared by all the FMs 40 (all the sequencers 117). In this embodiment, this is so the appropriate polling interval does not differ drastically for each FM 40 in the FM system 100, and to prevent increasing the size of the register for storing the polling interval for each FM 40.

Each sequencer 117 is in charge of any of the partial FM groups 41, and executes various processing for the FM 40 belonging to the relevant partial FM group 41. In this embodiment, a sequencer 0 is in charge of the partial FM group 41 of FM 00 through FM 0x, a sequencer 1 is in charge of the partial FM group 41 of FM 10 through FM 1x, a sequencer 2 is in charge of the partial FM group 41 of FM 20 through FM 2x, a sequencer 3 is in charge of the partial FM group 41 of FM 30 through FM 3x, and a sequencer x is in charge of the partial FM group 41 of FM x0 through FM xx.

The sequencer 117 includes registers 201 in the number corresponding to the number of FMs 40 in the partial FM group 41 that it is in charge of, and one Busy counter 202. The register 201 is an example of the start criterion storage part, and stores start criterion time information specifying a time for starting the execution of a status read for confirming a Busy state for any one of the FMs 40 in the partial FM group 41. In this embodiment, the start criterion time information, for example, is the execution time required for either a program or an erase by the target FM 40. In this embodiment, the sequencer 117, for example, is configured to start the execution of a status read after the passage of an execution time following the start of the execution of either a program or an erase.

The Busy counter 202 counts the execution time of either a program or an erase, and the time for starting the execution of a status read. The measurement part is configured here in accordance with the sequencer 117 function (primarily the Busy counter 202 function).

Next, processing performed by the FM system 100 related to the embodiment will be explained.

Figure 4:
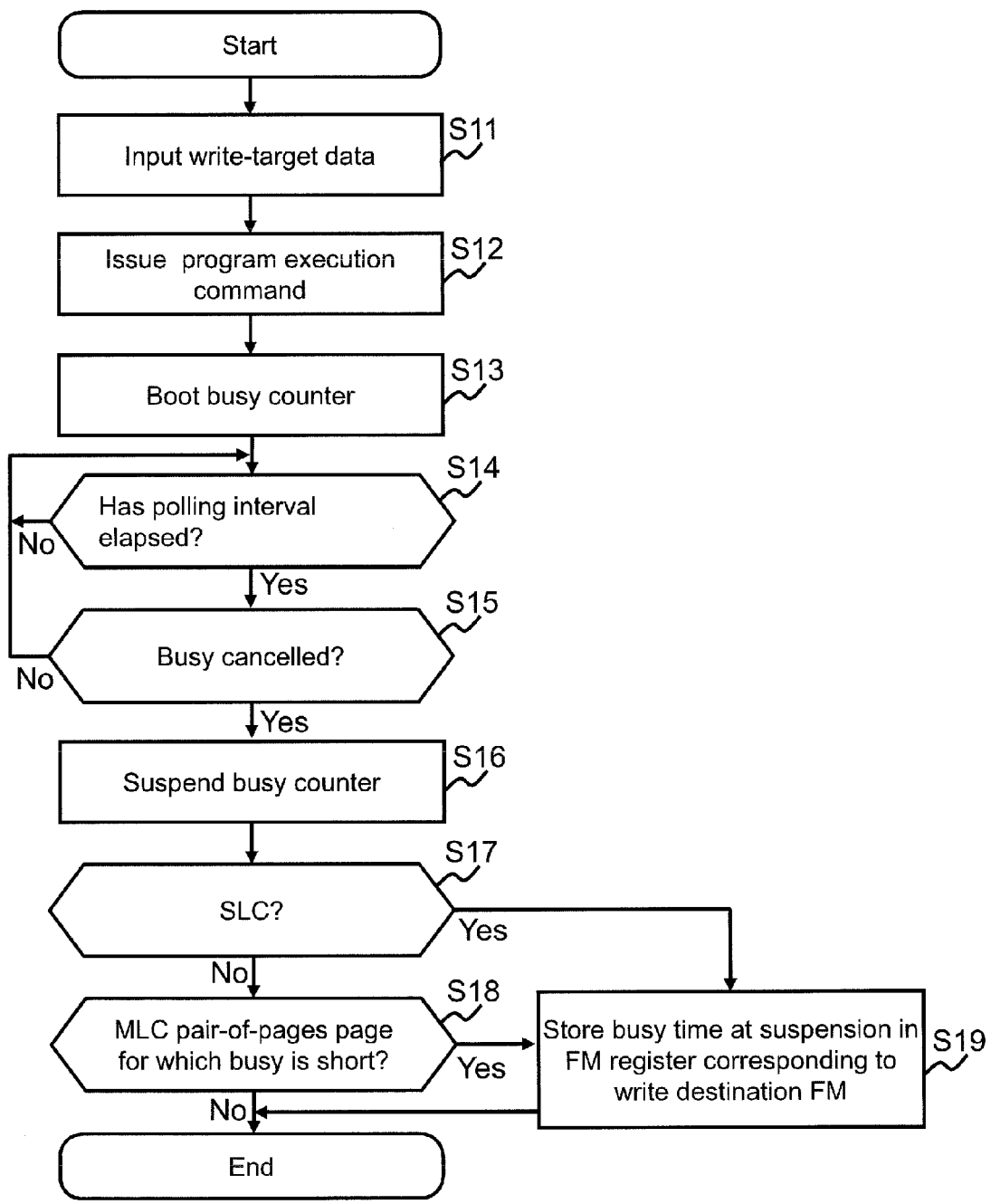
FIG. 4 shows a flow of processing related to the embodiment for configuring a Busy time at program execution.

FIG. 4 shows the flow of processing related to the embodiment for configuring a Busy time at program execution.

The process for configuring a Busy time at program execution, for example, is executed in a case where the sequencer 117 register 201 corresponding to the FM 40 that is the target of the program is the initial value, that is, a case where the Busy time has yet to be configured in the register 201, or a case where the Busy time configured in the register 201 is changed. This process for configuring Busy time at program execution may also be performed in a case where a Busy time is being configured in the register 201 corresponding to the program-targeted FM 40 in accordance with a process for configuring Busy time at erase execution (refer to FIG. 5), and in accordance with this, the program execution Busy time and the erase execution Busy time may be stored in the register 201.

The sequencer 117, upon receiving a write start instruction from the CPU 112 and inputting the write-target data (S11), issues a program execution command to the FM 40 that is the storage destination of the write-target data (S12). The sequencer 117 performing this processing is the sequencer 117 in charge of the FM 40 that is the write-target data storage destination. Next, the sequencer 117 boots up the Busy counter 202 (S13). In accordance with this, the Busy counter 202 counts the elapsed time following the issuing of the program execution command.

Next, the sequencer 117 determines whether or not the polling interval stored in the polling interval setup register 114 has elapsed (S14), and in a case where the polling interval has not elapsed (S14: No), moves the processing to Step S14. Alternatively, in a case where the polling interval has elapsed (S14: Yes), the sequencer 117 sends a status read signal to the FM 40, references the busy bit of the status data acquired from the FM 40, and determines whether or not Busy has been cancelled by determining whether or not the Busy state of the FM 40 has ended (S15). In a case where the result is that Busy has not been cancelled (S15: No), the sequencer 117 returns to the processing of S14.

Alternatively, in a case where Busy has been cancelled (S15: Yes), the sequencer 117 suspends the count by the Busy counter 202 (S16), and determines whether or not the FM 40 is a Single Level Cell (SLC)-type FM (S17).

In a case where the result is that the FM 40 is not an SLC-type FM (S17: No), the sequencer 117 determines whether or not the program-target page is the page within the pair of pages in the MLC-type FM 40 for which the program execution time is shorter (that is, the Busy state is shorter) (S18). In the MLC-type FM 40 here, a single memory cell can store multiple bits of information, and can provide multiple bits of storage area. In this MLC-type FM 40, the multiple bits of storage area provided by one memory sell are used as the storage areas of separate pages, and as a result, the storage area of the same memory cell group is allocated to multiple pages. As used here, a pair of pages refers to a multiple page group allocated as a storage area by the same memory cell like this. In the MLC-type FM 40, since multiple bits of information are stored in a single cell like this, the execution time for the processing will differ in accordance with which bit of the memory cell is written to, and as a result, the program execution time will differ in accordance with the pair of pages.

The determination in S18 as to whether or not the program-target page is the page of the pair of pages having the shorter execution time, for example, can be determined on the basis of the physical page number of the program target. For example, in a case where a smaller physical page number is allocated to the page having the shorter execution time for each pair of pages, a determination is made as to whether or not the program-target page is the page having the smallest physical page number in the pair of pages.

In a case where the result is the page having the short Busy state (S18: Yes), the sequencer 117 stores the time at which the Busy counter 202 was suspended, that is, the program execution time (Busy time) with respect to the page in the register 201 corresponding to the write-target FM 40 (S19), and ends the Busy time setup process at program execution. Alternatively, in a case where the page does not have the short Busy state (S18: No), the sequencer 117 ends the Busy time setup process at program execution. The reason for storing the Busy time in the register 201 only in a case where the page has the short Busy state here is as follows. That is, the sequencer 117 subsequently starts a sequence read after the Busy time of this register 201 has elapsed. Therefore, when a Busy time is configured for the page having a long Busy state, in a case where the sequencer 117 executes a program to the page having a shorter Busy state, a situation occurs in which the Busy state of the FM 40 will already have ended prior to this Busy time elapsing, giving rise to wasted time, during which other processing is unable to be performed despite the fact that the FM 40 is capable of processing, and a drop in response. By contrast, the occurrence of a situation such as this can be suitably prevented when the Busy time of the page having the short Busy state is configured in the register 201.

Alternatively, in a case where the FM 40 is an SLC-type FM (S17: Yes), the sequencer 117 stores the time at which the Busy counter 202 was suspended, that is, the program execution time (Busy time) with respect to the page in the register 201 corresponding to the write-target FM 40 (S19), and ends the Busy time setup process at program execution.

Figure 5:
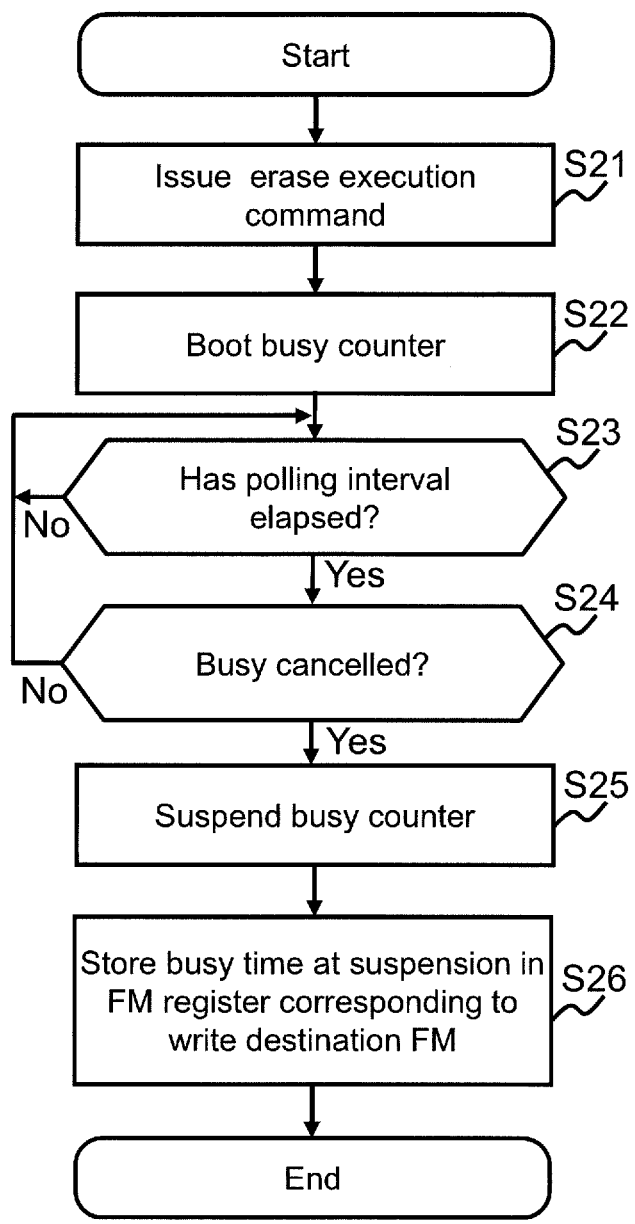
FIG. 5 shows a flow of processing related to the embodiment for configuring a Busy time at erase execution.

FIG. 5 shows the flow of a Busy time setup process at erase execution related to the embodiment.

The Busy time setup process at erase execution, for example, is executed in a case where the register 201 corresponding to the erase-target FM 40 is an initial value in the sequencer 117, that is, a case where the Busy time has yet to be configured, or a case where the Busy time configured in the register 201 is changed. The configuration may be such that this Busy time setup process at erase execution is performed even in a case where the Busy time has been configured in the register 201 corresponding to the erase-target FM 40 by the Busy time setup process at program execution (refer to FIG. 4), and in this case, the configuration may be such that the Busy time at program execution and the Busy time at erase execution are stored in the register 201.

The sequencer 117, upon receiving an erase indication for a physical block of a certain FM 40 from the CPU 112, issues an erase execution command to the FM 40 comprising the erase-target physical block (S21). The sequencer 117 that performs this processing is the sequencer 117 in charge of the FM 40 that comprises the erase-target block. Next, the sequencer 117 boots up the Busy counter 202 (S22). In accordance with this, the Busy counter 202 counts the elapsed time following the issuing of the erase execution command.

Next, the sequencer 117 determines whether or not the polling interval stored in the polling interval setup register 114 has elapsed (S23), and in a case where the polling interval has not elapsed (S23: No), performs the processing of Step S23 once again. Alternatively, in a case where the polling interval has elapsed (S23: Yes), the sequencer 117 sends a status read signal to the FM 40, references the busy bit of the status data acquired from the FM 40, and determines whether or not Busy has been cancelled by determining whether or not the Busy state of the FM 40 has ended (S24). In a case where the result is that Busy has not been cancelled (S24: No), the sequencer 117 returns to the processing of S23.

Alternatively, in a case where Busy has been cancelled (S24: Yes), the sequencer 117 suspends the count by the Busy counter 202 (S25), stores the time when the Busy counter 202 was suspended, that is, the erase execution time (Busy time) in the register 201 corresponding to the erase-target FM 40 (S26), and ends the Busy time setup process at erase execution. According to this processing, the execution time when the erase is executed in this FM 40 is stored in the register 201.

Figure 6:
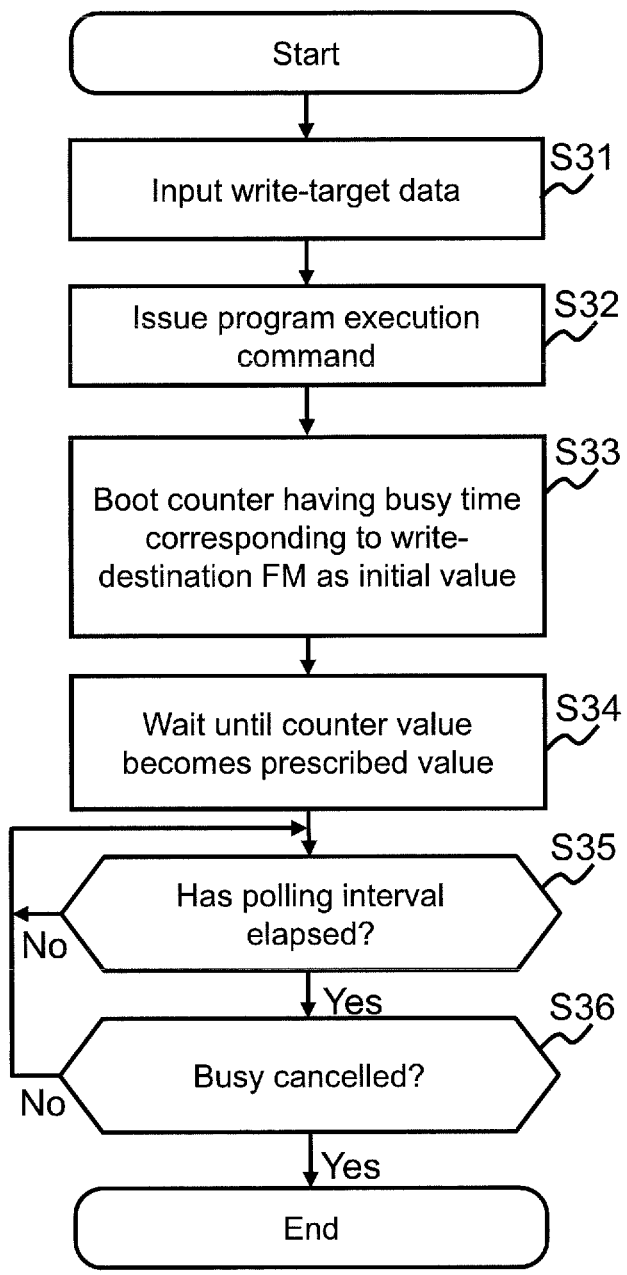
FIG. 6 shows the flow of processing at program execution related to the embodiment.

FIG. 6 shows the flow of processing at program execution related to the embodiment.

The processing at program execution is the processing when programming is performed in a case where the Busy time has already been stored in the register 201 in accordance with the processing of either FIG. 4 or FIG. 5.

The sequencer 117, upon receiving a write start instruction from the CPU 112 and inputting the write-target data (S31), issues a program execution command to the FM 40 that is the storage destination of the write-target data (S32). The sequencer 117 performing this processing is the sequencer 117 in charge of the FM 40 that is the write-target data storage destination.

Next, the sequencer 117 acquires the Busy time from the register 201 corresponding to the FM 40 that is the write destination of the write-target data, and boots up the Busy counter 202 having the relevant Busy time as the initial value of the counter value (S33). In a case where the Busy time at program execution and the Busy time at erase execution are in the register 201, the sequencer 117 acquires the Busy time at program execution. According to this processing, the Busy counter 202, for example, reduces the count value corresponding to the configured Busy time in accordance with the elapsed time.

Next, the sequencer 117 holds off on processing until the count value of the Busy counter 202 becomes a prescribed value (for example, either 0 or a value near 0) (S34). Therefore, during the time that the FM 40 can be estimated to be in the Busy state, the sequencer 117 does not execute a status read for checking the status of the FM 40. Therefore, a wasted status read polling is not performed during this period, making it possible to prevent wasted power consumption. Also, for example, in a case where the sequencer 117 uses the Busy time configured using the Busy time setup process at program execution shown in FIG. 4, the Busy time is the Busy time corresponding to the page having the short Busy state of the pair of pages of the MLC-type FM 40, and as such, even when the program-target page is the page having the short Busy state, a situation in which the FM controller 102 is not aware that the Busy state is over despite the fact that the FM 40 Busy state has ended can be suitably prevented, and the response does not drop.

In a case where the count value of the Busy counter 202 transitions to the prescribed value thereafter, the sequencer 117 determines whether or not the polling interval stored in the polling interval setup register 114 has elapsed from a prescribed time point (for example, the time point at which the count value became the prescribed value in a case where the sequencer 117 initially executes the relevant step, and subsequent thereto, the time point at which the previous polling interval elapsed) (S35), and in a case where the polling interval has not elapsed (S35: No), performs the processing of Step S35 once again.

Alternatively, in a case where the polling interval has elapsed (S35: Yes), the sequencer 117 sends a status read signal to the FM 40, references the busy bit of the status data acquired from the FM 40, and determines whether or not the Busy has been cancelled by determining whether or not the FM 40 Busy state has ended (S36). In a case where the result is that the Busy has not been cancelled (S36: No), the sequencer 117 returns to the processing of S35.

Alternatively, in a case where the Busy has been cancelled (S36: Yes), the sequencer 117 suspends the count by the Busy counter 202, notifies the CPU 112 to the effect that the write-destination FM 40 is not in the Busy state, and notifies the CPU 112 of the end of the process at program execution. In accordance with this, the CPU 112 is able to cancel Busy for the write-destination FM 40, and to execute various processing with respect to the relevant FM 40.

Next, the flow of processing at erase execution will be shown. The differences with the processing at program execution shown in FIG. 6 will be explained by referring to FIG. 6.

The processing at erase execution is the process when the sequencer 117 executes an erase in a case where the Busy time has already been stored in the register 201 in accordance with the processing of either FIG. 4 or FIG. 5.

In the processing at erase execution, the sequencer 117, upon receiving an erase indication for a physical block of a certain FM 40 from the CPU 112, issues an erase execution command to the FM 40 comprising the erase-target physical block in place of S31 and S32. The sequencer 117 performing this processing is the sequencer 117 in charge of the FM 40 comprising the erase-target physical block.

Next, the sequencer 117 acquires the Busy time from the register 201 corresponding to the FM 40 comprising the erase-target physical block in S33, and boots up the Busy counter 202 having the relevant Busy time as the initial value of the count value. In a case where the Busy time at program execution and the Busy time at erase execution are in the register 201, the sequencer 117 acquires the Busy time at erase execution. The processing subsequent to S34 is substantially the same as the processing at program execution. In the processing at erase execution as well, the sequencer 117 does not execute a status read for checking the state of the FM 40 during the time that the FM 40 can be estimated to be in the Busy state. Therefore, wasted power consumption can be prevented.

Figure 7:
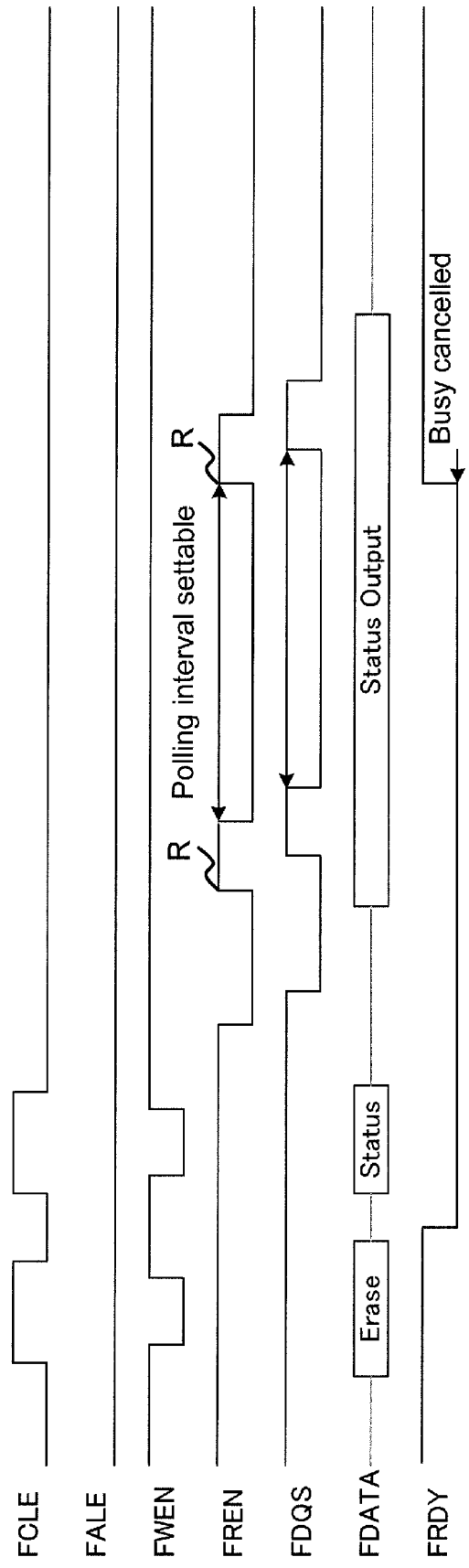
FIG. 7 is a drawing illustrating a polling interval related to the embodiment.
Figure 9:
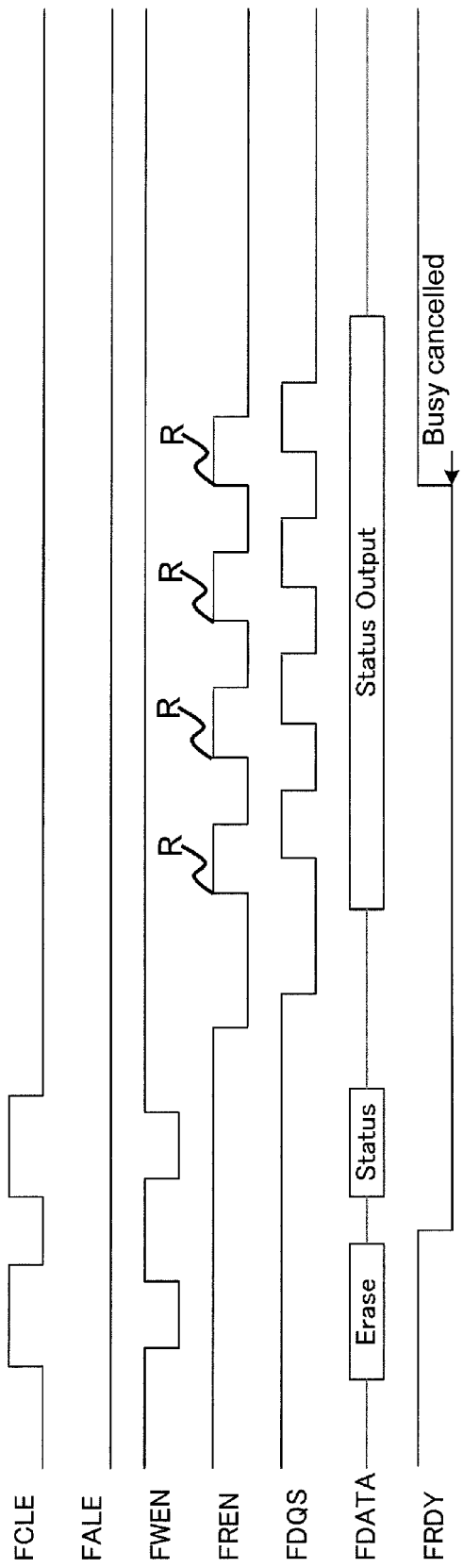
FIG. 9 is a drawing illustrating a polling interval related to the prior art.

FIG. 7 is a drawing illustrating a polling interval related to the embodiment. FIG. 9 is a drawing illustrating a polling interval related to the prior art.

FIG. 7 shows the state of various signals exchanged between the sequencer 117 and the FM 40. As the signals exchanged between the sequencer 117 and the FM 40, there are a command latch enable signal (FCLE), an address latch enable signal (FALE), a write enable signal (FWEN), a read enable signal (FREN), a data strobe signal (FDQS), a data bus signal (FDATA), and a Busy signal (FRDY). In this embodiment, the Busy signal does not need to be exchanged between the sequencer 117 and the FM 40.

The FCLE is regarded as a prescribed state (for example, high) when the sequencer 117 sends a command to the FM 40. The FALE is regarded as a prescribed state (for example, high) when the sequencer 117 outputs an address to the FM 40. FWEN is regarded as a prescribed state (for example, low) when the sequencer 117 writes to the FM 40. FREN is regarded as a prescribed state (for example, low) when the sequencer 117 reads from the FM 40. In this embodiment, FREN is regarded as the rise and fall when the sequencer 117 performs an FM 40 status read at a Double Data Rate (DDR) transfer. This toggle signal is the status read signal. FDQS is the signal for sending and receiving data at a DDR transfer. In this embodiment, the FDQS is used to receive status read data. FDATA is the signal for sending and receiving data. The status data sent from the FM 40 to the sequencer 117 when a status read has been performed for the FM 40 is included in the FDATA. FRDY is the signal that shows whether or not the FM 40 is in the Busy state, and, for example, is regarded as a prescribed state (for example, low) in the case of the Busy state.

In the prior art, the status read signal R is sent and a status read is performed in accordance with a polling interval that has been fixedly determined in the FM controller as shown in the FREN of FIG. 9. By contrast, according to this embodiment, the polling interval for sending the status read signal R becomes the polling interval configured in the polling interval setup register 114 as shown in the FREN of FIG. 7. The polling interval can be configured in the polling interval setup register 114 by the CPU 112. Therefore, an appropriate polling interval can be configured in accordance with the performance of the FM 40 provided in the FM system 100. Therefore, for example, it is possible to configure a polling interval for the status read signal R that is longer than in the past, and it is also possible to reduce power consumption. FIGS. 7 and 9 show the signal when the sequencer 117 executes an erase, but the DATA erase command (Erase) of FIGS. 7 and 9 may be replaced with a program command when executing a program, and the other signals will be the same in this drawing.

Figure 8:
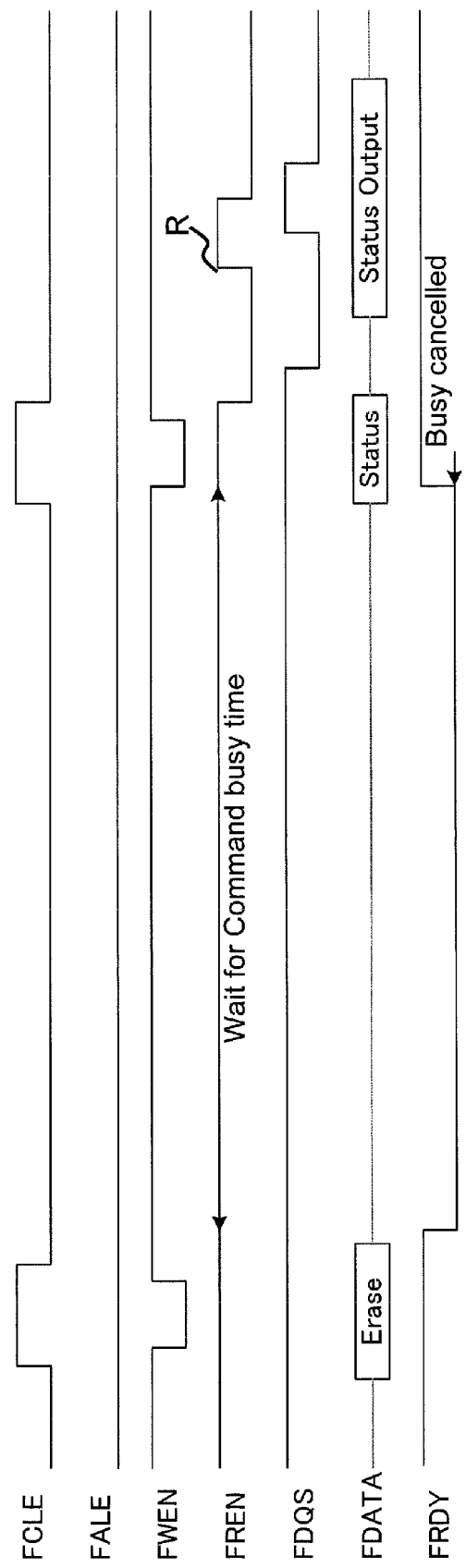
FIG. 8 is a drawing illustrating a Busy time related to the embodiment.

FIG. 8 is a drawing illustrating a Busy time related to the embodiment.

FIG. 8 shows the states of various signals sent between the sequencer 117 and the FM 40. The various signals are the same as those explained using FIG. 7.

In this embodiment, a status command (Status) is sent from the sequencer 117 to the FM 40 to start the output of the status read signal R. In this embodiment, the timing for sending the status command is immediately following the end of the Busy time stored in the register 201 corresponding to the FM 40 as shown in the FDATA of FIG. 8, and thereafter, the status read signal R is sent as shown in the FREN to start the status read.

This Busy time is obtained by measuring the execution time of the erase process (or the program process) for each FM 40, and is approximately the same time as the Busy state shown in the FRDY. Therefore, it is possible to reduce the outputting of status read signals R during the time that the FM 40 constitutes the Busy state, and to reduce power consumption. FIG. 8 shows the signals when the sequencer 117 executes an erase, but the DATA erase command (Erase) of FIG. 8 may be replaced with a program command when executing a program, and the other signals will be the same as in the same drawing.

The embodiments have been explained hereinabove, but these embodiments are examples for illustrating the present invention, and do not purport to limit the scope of the present invention solely to these embodiments. That is, the present invention can be put into practice in a variety of other modes.

What is claimed is:

1. A flash memory controller for programming and erasing data with respect to a flash memory, comprising:
    a polling interval storage part is configured to store a polling interval, which is a time interval for outputting an acquisition signal for acquiring from the flash memory, information showing whether or not an execution of programming or erasing has ended after the execution of the programming or the erasing has started with respect to the flash memory;
    a setup part is configured to configure the polling interval in the polling interval storage part;
    a polling processor is configured to send either a program command or an erase command to the flash memory, and, thereafter, output the acquisition signal in accordance with the polling interval until information denoting that the execution of either the programming or the erasing has ended is received;
    a start criterion storage part is configured to store start criterion time information constituting a time criterion for starting an output of the acquisition signal;
    a measurement part is configured to measure an execution time required for either programming or erasing data with respect to the flash memory; and
    a start criterion setup part is configured to store the measured execution time in the start criterion storage part as start criterion time information,
    wherein the polling processor is configured to start outputting the acquisition signal on the basis of the start criterion time information stored in the start criterion storage part.

2. A flash memory controller according to claim 1,
    wherein the flash memory is a Multi Level Cell (MLC) flash memory and comprises a plurality of blocks, each block comprising a plurality of pages, and
    wherein the start criterion setup part is configured to store, in the start criterion storage part, the execution time for a page, of a pair of pages in the flash memory, for which the time required for programming is shorter.

3. A flash memory controller according to claim 1,
    wherein the flash memory is provided in plurality,
    wherein the start criterion storage part exists for each of the flash memories, wherein the start criterion storage part is configured to store the execution time for the flash memory corresponding to that start criterion storage part as start criterion time information, and wherein the polling processor is configured to acquire start criterion time information from a start criterion storage part corresponding to a destination flash memory of either the program command or the erase command from among the plurality of start criterion storage parts, and start outputting the acquisition signal to the destination flash memory of either the program command or the erase command on the basis of this start criterion time information.

4. A flash memory controller according to claim 1, wherein the flash memory is provided in plurality, and wherein the polling interval storage part is shared by the plurality of flash memories.

5. A flash memory controller according to claim 1, wherein the measurement part is configured to measure the execution time for the flash memory in a case where the start criterion time information is configured or changed.

6. A flash memory system, comprising:

the flash memory controller according to claim 1; and a flash memory coupled to the flash memory controller.

7. A flash memory control method, comprising the steps of:

configuring, in a polling interval storage part, a polling interval, which is a time interval for outputting an acquisition signal for acquiring from the flash memory, information showing whether or not the execution of programming or erasing has ended after execution of the programming or the erasing has started with respect to the flash memory; and sending either a program command or an erase command to the flash memory, and thereafter outputting the acquisition signal in accordance with the polling interval until information denoting that the execution of either the programming or the erasing has ended is received, and further comprising, storing start criterion time information constituting a time criterion for starting an output of the acquisition signal in a start criterion storage part;

measuring an execution time required for either programming or erasing data with respect to the flash memory;

storing the measured execution time in the start criterion storage part as start criterion time information; and outputting the acquisition signal on the basis of the start criterion time information stored in the start criterion storage part.

\* \* \* \* \*